United States Patent [19]
Ahmad et al.

[11] Patent Number: 5,435,370
[45] Date of Patent: Jul. 25, 1995

[54] PNEUMATIC TIRE HAVING DISCONTINUOUS OUTER CARCASS PLY

[75] Inventors: Shamim Ahmad, North Canton; Kenneth V. Kenreich, Tallmadge; Leonard A. Kopka, Akron; Joe A. Powell, Norton, all of Ohio

[73] Assignee: Uniroyal Goodrich Licensing Services, Inc., Dover, Del.

[21] Appl. No.: 758,432

[22] Filed: Aug. 30, 1991

Related U.S. Application Data

[63] Continuation of Ser. No. 394,041, Aug. 15, 1989, abandoned, which is a continuation-in-part of Ser. No. 12,238, Feb. 9, 1987, abandoned, which is a continuation of Ser. No. 731,688, May 8, 1985, abandoned.

[51] Int. Cl.⁶ .................................................. B60C 9/08
[52] U.S. Cl. ................................ 152/550; 152/510; 152/543; 152/548; 152/560
[58] Field of Search ............... 152/539, 538, 543, 548, 152/550, 551, 552, 554, 555, 560

[56] References Cited

U.S. PATENT DOCUMENTS

| | | |
|---|---|---|
| 3,058,509 | 10/1962 | Maiocchi . |
| 3,244,216 | 4/1966 | Sprowl et al. ........ 152/510 |
| 3,481,386 | 12/1969 | Menell et al. . |
| 3,509,930 | 5/1970 | Mirtain . |
| 3,939,893 | 2/1976 | Schmidt ........ 152/543 |
| 4,096,899 | 6/1978 | Kitazawa et al. . |
| 4,185,675 | 1/1980 | Greiner et al. . |
| 4,279,284 | 7/1981 | Spadone ........ 152/510 X |
| 4,287,929 | 9/1981 | Huinink ........ 152/555 X |
| 4,341,250 | 7/1982 | Welter . |
| 4,573,511 | 3/1986 | Kabe et al. . |

FOREIGN PATENT DOCUMENTS 0161202 11/1985 European Pat. Off. .

Primary Examiner—Geoffrey L. Knable
Attorney, Agent, or Firm—Alan A. Csontos; Michael J. Colitz, Jr.

[57] ABSTRACT

An improved radial tire is reinforced with at least two carcass plies of radial rubberized cords wherein a radial inner or first ply extends continuously from one bead portion to another bead portion through the sidewall areas and across the crown of the tire and a radial outer or second ply in continuous contact with the inner ply has two sections disposed such that the second ply is discontinuous or interrupted in the crown area. The second ply is also foreshortened in the bead portion of the tire rather than being wrapped around the bead. An inner liner is also in constant contact with the inner ply from bead portion to bead portion without being wrapped therearound.

1 Claim, 2 Drawing Sheets

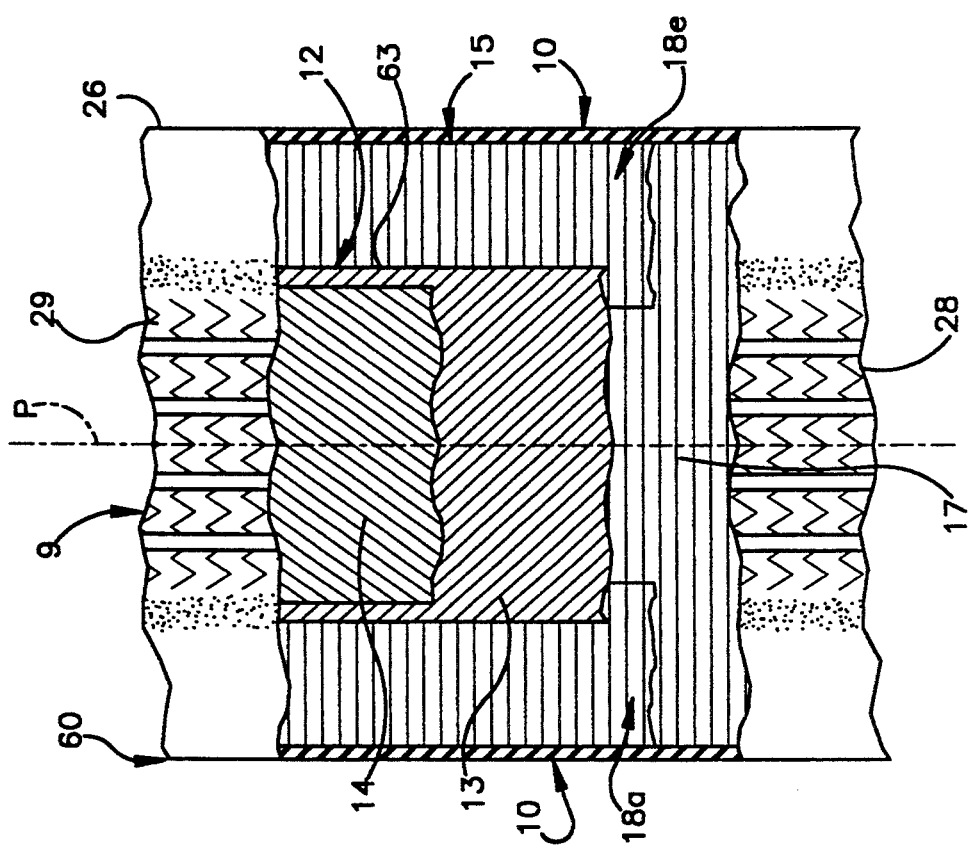
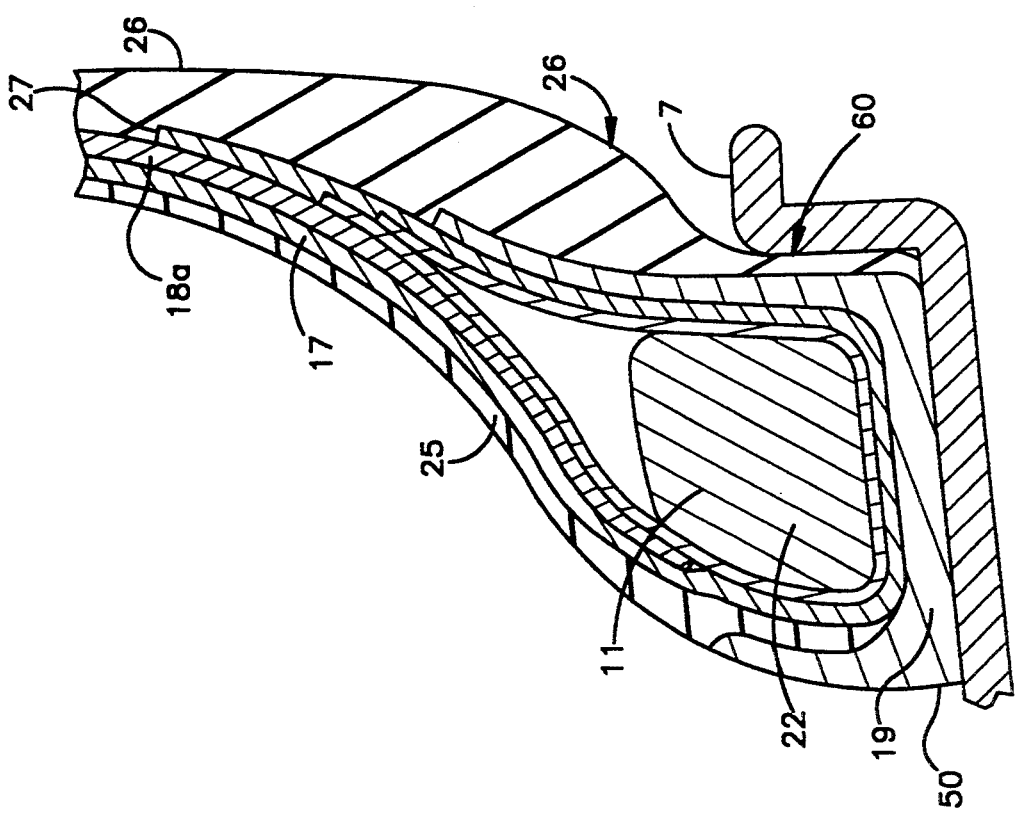

PNEUMATIC TIRE HAVING DISCONTINUOUS OUTER CARCASS PLY

HISTORY OF THE APPLICATION

This application is a continuation of U.S. patent application Ser. No. 07394,041 filed on Aug. 15, 1989, now abandoned, which is a continuation-in-part of U.S. patent application Ser. No. 07/012,238 filed on Feb. 9, 1987, which in turn is a Continuation of U.S. application Ser. No. 06/731,688 filed May. 8, 1985, now abandoned.

BACKGROUND OF THE INVENTION

This invention relates to pneumnatic tires and particularly to radial type pneumatic tires.

Radial type pneumatic tires typically include a crown area with an annular belt, a pair of sidewall areas, a pair of bead portions, and a carcass or body which includes one or more carcass plies of rubberized cords oriented substantially at a 90° angle (radially) to the circumferential center plane of the tire. The cords of these carcass plies can be made of such material as metal, glass; natural textile or synthetic textile such as rayon, nylon, polyester, aromatic polyamide or other similar materials.

The carcass of a radial tire provides structural stability to the tire reduces susceptibility of the tire to bruising, and reduces the possibility of separation of tire components occurring within the tire. In the crown area of the tire, an annular belt also aids in reducing susceptibility of the tire to bruising.

The number of carcass plies incorporated into a radial tire carcass is usually dependent on the intended service or use of the tire. Radial tires having at least two continuous carcass plies include such tires serving as large passenger tires and light truck radial tires. In such tires, the plies generally extend continuously from one bead portion of the tire adjacent to the shoulder and crown areas to the other bead portion and in most tires each ply is wrapped around a wire bead in each bead portion.

It has been found in a radial tire carcass with two continuous inner (first) and outer (second) plies that the second ply provides limited structural stability in the crown area of the tire and the bead portions of the tire. The second ply also provides limited resistance to bruising in the crown area of the tire because the belt provides much of the resistance to bruising.

Tire manufacturers are continuously searching for ways to reduce the overall weight of radial tires and the costs to manufacture them. Relatively unsuccessful attempts have been made to design a single ply radial tire for service which traditionally requires two or more carcass plies. Other attempts have focused on reducing the amount of carcass material in one of the plies of a multi ply tire, as illustrated in tires containing discontinuous radial outer or second plies as described, for example, in U.S. Pat. No. 3,058,509; 3,062,259; 3,481,386; 3,509,930; 4,096,899; 4,185,675; 4,341,250; 4,573,511 and European Patent Number 0,161,202. In '509, '386, '930 and '899 tire are disclosed each having an outer carcass ply which is discontinuous or interrupted in the crown area of the tire, but is out of contact with the inner carcass ply in the bead area.

The outer plies disclosed in '386; '930 and '899, for example, are also discontinuous in the crown area of tires as well as at locations adjacent to the bead wire. Often the cords and/or rubber in such a discontinuous outer ply are of special materials other than the materials that make up the continuous radial inner or first ply.

The tires disclosed in '259 and '250 do not utilize split plies while '202 employs two plies, both of which are split.

In '675, for example, a second discontinuous ply is different from the first ply in that the rubber of the second ply has a shore A hardness after vulcanization of 40° to 50°. Weight and cost advantages of incorporating a discontinuous ply are often negated when the materials in the second discontinuous ply are different from the materials in the first continuous ply.

The split ply tires of '675 and '511 do not terminate their outer carcass ply and liner at the bead and, like all of the prior art, do not employ two identical carcass plies in continuous contact with each other and both with radial cords.

Also, it has been found that significant forces can act between the rim of the wheel upon which the tire is mounted and the lower sidewall portions of the tire. In the sidewall portion, significant forces act on the tire in the region where the wheel rim flange physically contacts the sidewall therein. In this rim flange contact region, the sidewall flexes over the rim flange. The rim flange contact region of the tire must be made strong enough to endure such flexing and forces resulting therefrom.

Furthermore, it has been found that a predetermined thickness in each bead portion between the radial inner part of the bead wire and the surface of the bead portion must be maintained to allow for suitable mounting of the tire on the rim.

Thus, when designing tires with discontinuous carcass plies, unsatisfactory tires can result by ignoring particular areas of the tire where special forces occur and specific requirements in the bead area are desired.

SUMMARY OF THE INVENTION

It is an object of the invention to provide an improved pneumatic radial type tire with a liner, a radial continuous inner ply, and radial discontinuous outer plies wherein the liner and outer plies are in continuous contact with the inner ply and terminate at the bead area without turning around the bead.

Another object of this invention is to provide a radial tire which performs comparably to a typical radial tire with two or more continuous carcass plies but which is characterized by reduced manufacturing costs and weight when compared with such a typical tire.

It is yet another object of this invention to reduce the cost of split ply tires by minimizing materials utilized and employing more cost-efficient fabrication techniques.

These and other objects, which will become evident from the following description, are attained in accordance with this invention by having a radial type pneumatic tire which includes a circumferential center plane, a pair of bead portions containing bead wire, a crown area or portion which includes a belt assembly, a pair of sidewall areas axially inward of the edges of the belt assembly adjacent to the first ply in constant contact therewith and a carcass comprising: a radial inner ply which contains rubberized cords oriented radially to the circumferential center plane of a tire, which radial inner ply extends continuously from one bead portion to the other bead portion and is anchored in such bed portion by being wrapped around the bead wire; and a radial outer ply, which has two sections, such that such radial outer ply is discontinuous in the crown area of the tire and the bead portion of the tire. Each section of the radial outer ply is in constant contact with the inner ply and extends from the bead portion to axially inward of the edges of the belt assembly.

BRIEF DESCRIPTION OF THE DRAWINGS

FIG. 2 is an enlarged cross-sectional view of a portion of FIG. 1 showing the bead area in greater detail.

FIG. 3 is a fragmentary view of a crown area of the tire of FIG. 1.

DETAILED DESCRIPTION

Figure 1:
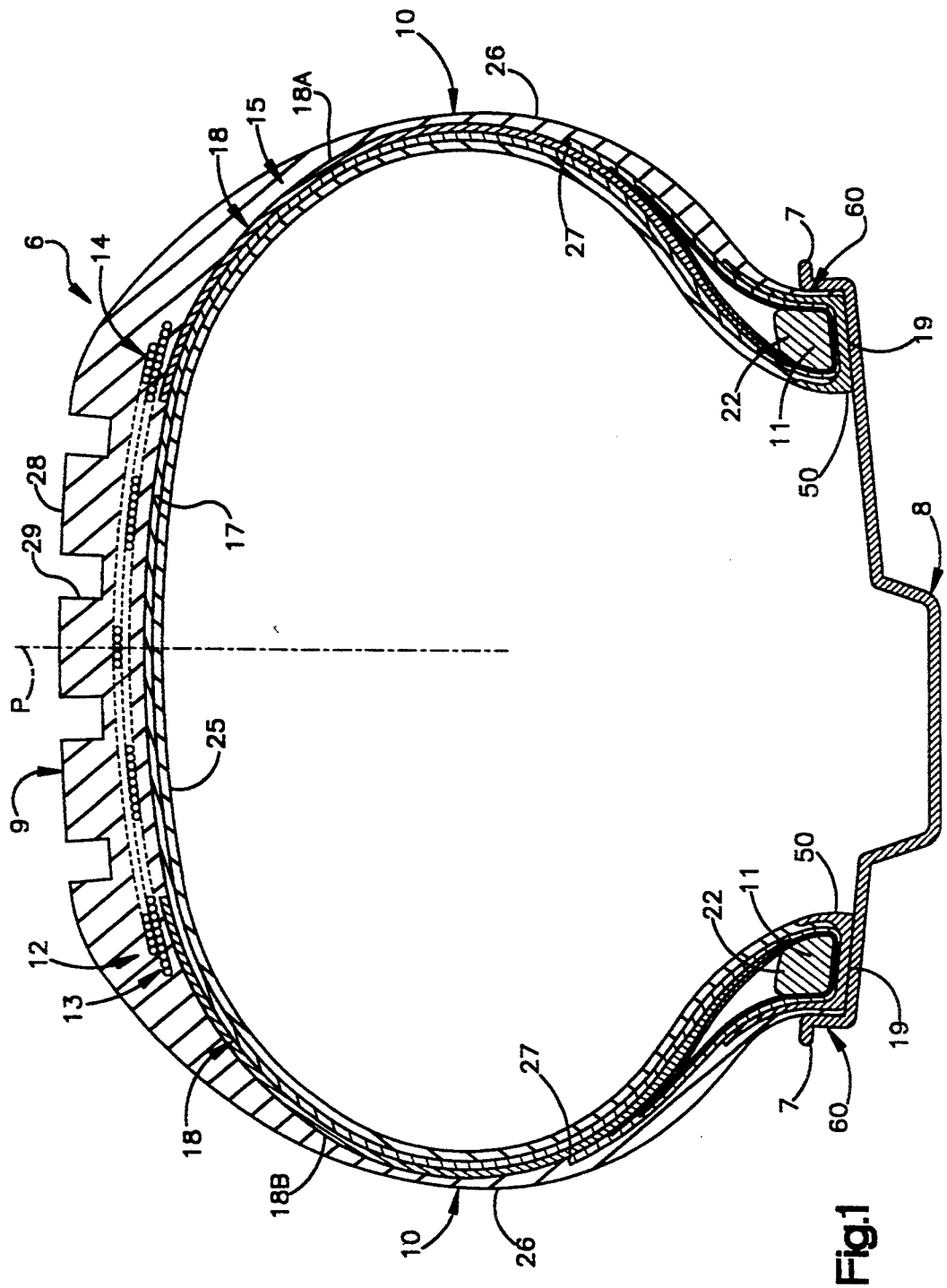
FIG. 1 is a cross-sectional view of a radial tire containing one embodiment of this invention.

This invention can be described in further detail in terms of the presently preferred embodiments and with reference to the three figures of the drawings wherein like reference characters refer to like features or components.

The invention is described embodied as a large passenger radial tire. Although this invention is very well suited to passenger tires, it is also adaptable to other types and sizes of tires such as light truck radial tires and other larger multiple ply radial tires.

A shaped and vulcanized radial pneumatic tire 6 is shown mounted on a rim 7 of a wheel 8. The tire 6 includes a crown area or portion 9, a pair of sidewall areas 10 and a pair of bead portions 11 shaped for engagement with the rim 7 on which the tire 6 is to be mounted. Included in each bead portion 11 is a wire bead 22.

The crown portion 9 generally includes a layer of tread rubber 28 which has a suitable pattern 29 of alternate grooves and ribs to provide traction and resistance to skid. Radially inward of the layer of tread rubber 28 is a belt assembly 12. The belt assembly 12 contains two belts 13 and 14 composed of rubberized cords of low extensible materials such as nylon, rayon, fiberglass steel or aromatic polyamide. The cords in the belts 13 and 14 are disposed at an acute angle at between about 10° to about 30° relative to the circumferential center plane P of the tire 6. It is preferred that such cords are oriented at equal but opposite angles in adjacent belts 13 and 14.

Each pair of sidewall areas 10 is generally composed of a suitable thickness of sidewall rubber 26 which extends from the margins of the tread rubber 28 to each bead portion 11. Each sidewall area 10 presents a region 60 adjacent to the rim 7 where flexing of the sidewall area 10 against the rim 7 occurs. Such regions 60 in the sidewall area are referred to as a rim flange contact region.

The tire 6 has a carcass 15 having two plies of rubberized cords, a radial inner or first ply 17 and a radial outer or second ply 18. The second ply 18 has two sections 18a and 18b. The cords in the two carcass plies 17 and 18 may be of suitable material used as carcass reinforcing cords and are oriented such that the individual rubberized cord lie radial to the circumferential center plane P of the tire. Preferably the first and second ply are made of the same cord and rubber material. The edges 27 of the first ply 17 are wrapped around the wire beads 22 in bead portions 11.

As particularly seen in FIGS. 1 and 2, each of the two sections 18a and 18b of the second ply 18 extend from radially inward of the belt 13 to a point between the first ply 18 and the bead portion 11 whereat it terminates without wrapping around the bead. Each section 18a and 18b extends axially inwardly to underlap each belt edge 63 by preferably at least about 12 percent of the width of the belt 13. The width of belt 13 is about 6 inches (21.24 cm) whereby each section 18a and 18b extend axially inwardly of each belt edge 63 by at least about ¾ inch (1.86 cm).

The second ply 18 extends radially inwardly of edge 73 of the first ply 17 by at least 1½ inches (3.72 cm). The second ply is in constant contact with the first ply throughout its entire extent. Also, the second ply 18 preferably extends about ⅜ inch (0.93 cm) radially inward of the rim flange contact region 60. Further the radially inward edge does not wrap around the bead for material for fabrication efficiency.

The tire 6 includes an inner liner 25 which is composed of rubber material such as butyl rubber which is suitable to resist diffusion of air from the tire 6. As shown in FIGS. 1 and 2, the inner liner 25 extends from one bead portion 11, through each sidewall area 10 and the crown area 9 to the other bead portion 11. In this embodiment, inner liner 25 serves to provide additional or "filler" material in each bead portion 11 to allow for suitable mounting of the tire 6 on the rim 7 of the wheel 8. The thickness of the inner liner 25 is preferably sufficient to provide air diffusion resistance. The liner is in constant contact with the inner ply and has its ends terminate at the bead area without wrapping therearound for reduced material usage and increased fabrication efficiency.

Each bead portion 11 includes a "toe" 50 and a finishing strip 19 which generally consists of rubber material or rubber-coated fabric. As shown in FIG. 1, each finishing strip 19 extends from axial outward of the second ply 18 and the inner liner 25, to a position about ⅜ inch (0.92 cm) radially outward of the toe 50. The finishing strip 19 generally extends radially outward of the edge of the second ply 18 by about ¾ inch (1.86 cm). In this embodiment, finishing strip 19 serves to resist chafing between the bead portion 11 and the rim 7.

The fabrication techniques employed with the split ply tire of the present invention allow for cost reductions during fabrication.

It is understood that certain departures from and modifications to the preferred embodiment described are possible within the scope of the invention which is to be measured by the following claims. Now that the invention has been described:

What is claimed is:

1. A pneumatic tire containing a circumferential center plane, said tire suitable for mounting on a wheel wherein the tire interfaces with a pair of rim flanges of the wheel, said tire comprising:
   a pair of bead portions;
   a crown portion comprising a layer of tread rubber and an annular belt assembly of selected width;
   a pair of sidewall areas each comprising a selected thickness of sidewall rubber with a rim flange contact region;
   a carcass of rubberized cords, all the cords being disposed in angles normal to said circumferential center plane of the tire, said carcass comprising a radial inner ply extending continuously from one bead portion to the other radially along said pair of sidewall areas and axially across said crown portion and a radial outer ply made of the same cord and rubber material as that of the inner ply and which has two sections, each section in continuous contact with the inner ply and extending from axially inwardly of the edges of said belt assembly radially along a portion of each sidewall area to locations adjacent to the axially inward edges of the bead wires and terminating at locations adjacent to the radially outer edge of the bead wires and axially interior thereof without wrapping around the bead wire;

a liner extending continuously from one bead portion to the other in contact with the inner ply with its radially inner edges terminating at locations laterally adjacent to the radially inner edges of the bead wires; and a pair of finishing strips, each finishing strip located at a radially inner edge of the tire and extending radially outwardly over the liner to a location adjacent to the radially outer end of the bead and axially interior thereof and extending outwardly over a portion of the first ply to a location beyond the radially outer end of the bead.

* * * * *